Patented June 8, 1937

2,082,950

UNITED STATES PATENT OFFICE 2,082,950

COATING ZINC AND THE COATED ARTICLE

Matthew Green, Detroit, Mich., assignor to Parker Rust-Proof Company, Detroit, Mich., a corporation of Michigan No Drawing. Original application January 21, 1932, Serial No. 587,967. Divided and this application October 2, 1935, Serial No. 43,198

6 Claims. (Cl. 148—6)

This invention relates to coating zinc and to articles produced thereby and more particularly to the acceleration of the formation on zinc of a coating of an approximately insoluble salt of zinc and other materials. This application is a division of application Serial No. 587,967 filed Jan. 21, 1932.

It has long been known that a hot dilute solution of phosphoric acid acts on iron and, after sufficient iron has been dissolved to "balance" the solution, a coating of comparatively insoluble phosphate is formed on the iron. This coating is rust resistant and also makes an excellent foundation for paint or lacquer.

Similarly, a hot dilute solution of phosphoric acid will dissolve zinc until it becomes "balanced", and thereafter will form on zinc a phosphate coating. If the solution is previously "balanced", the coating operation takes less time than when the start is made with the acid solution, but it still requires an objectionably long time. The speed of operation varies with the condition of the zinc surface, but one half hour is a fairly short time within which to secure a coating on zinc in a balanced zinc phosphate bath.

I have discovered that the addition of iron to the bath greatly accelerates its action, and also improves the quality of the resulting coating on the zinc, making it much more adherent. The amount of iron in the bath may be varied widely. The good effects of the iron increase with increase of the iron, at least until there is one half as much iron as zinc dissolved in the bath. With such a solution, a coating sufficient for bonding paint may be produced on a zinc surface in as little as thirty seconds, and is completed so that bubbling substantially ceases in from three to five minutes.

A solution may be used containing no zinc, if preferred, the solution containing compounds of iron, or of iron and manganese. If manganese phosphate is used, there should be twice as much iron as manganese in the bath for best results; and the iron goes into the coating much more rapidly than the manganese, so that replenishment must be chiefly by iron, otherwise the manganese will soon become objectionably high. For this reason zinc phosphate with a soluble compound of iron, sufficient to furnish from one-third to one-half as much iron as there is zinc in the zinc phosphate, is preferred. A powder consisting of zinc dihydrogen phosphate and a suitable soluble compound of iron is an advantageous form in which to sell and ship the necessary chemicals.

Zinc can be coated with zinc salts of certain organic acids in a similar manner. These acids comprise the dicarboxylic and hydroxy-dicarboxylic acids in the aliphatic series and carboxylic acids having but one carboxyl group and sulphonic acids in the aromatic series. In each case, the addition of a soluble compound of iron accelerates the action and improves the resulting coating.

One example of a very good solution for coating zinc is an aqueous solution of oxalic acid, sodium nitrate and sulphate of iron. It is preferable to use this solution as a spray. It may be mixed with inert material, sprayed onto a zinc surface, and dried thereon and then removed, or it may be merely sprayed on as a liquid and the remnant washed off.

One specific mixture, with the inert material, which has been found satisfactory is:

| | | |
|---|---|---|
| Water | gallon | 1 |
| Oxalic acid | grams | 360 |
| Sodium nitrate | do | 120 |
| Ferrous sulphate | do | 60 |
| Fuller's earth | pounds | 4 |

The oxalic acid, sodium nitrate and ferrous sulphate may be mixed in about the proportion specified and in the granular form, and dissolved in water to form the solution when desired. The granular material may be shipped without paying freight on water, and still correct proportions insured.

A satisfactory liquid spray may be made by dissolving the same amounts of chemicals in 1½ gallons water and omitting the fuller's earth. Such a solution coats a zinc surface even when at usual atmospheric temperature, and the action is very rapid at a slightly elevated temperature.

Other organic acids of the group mentioned above may be substituted for oxalic acid, though most of them act more slowly than oxalic acid and some require heating to produce results. Of these other acids, malonic, tartaric and gallic acids deserve special mention.

Other agents having a similar oxidizing effect may be substituted for sodium nitrate. These include the various nitrates, nitrites, sulphites, etc., each of which has the desired oxidizing effect.

Other soluble compounds of iron may be substituted for the ferrous sulphate, the sulphate being cited because of its commercial availability.

If inert material is added, any other material having the necessary qualities may be substituted for fuller's earth.

Apparently, in any case when a solution of a salt will react with zinc and iron, each separately, to produce a substantially insoluble salt on the surface of the metal, the action of the solution on zinc is greatly expedited by the presence of a soluble compound of iron, and the resulting coating is improved in quality and adherence. An article coated in this manner has a surface exceedingly well adapted to receive a finishing coat of paint, lacquer or enamel, and comprising apparently a substantially insoluble salt of zinc and a similar salt of iron. The above description explains how this discovery may be utilized with various solutions, and will be understood as illustrative rather than exhaustive, as the invention is capable of wide application within the terms of the appended claims, in which it will be understood that "surface of zinc" applies to the zinc coating on galvanized iron as well as to all other instances where a surface of zinc is presented.

What I claim is:

1. An article having a zinc surface covered by a coating comprising substantially insoluble salts of zinc and iron with phosphoric acid, said coat being of a kind and quantity adapted to hold paint on said surface.

2. In a method of coating a metallic zinc surface comprising subjecting the said surface to the coating action of a coating material consisting of acid phosphate the step which comprises accelerating the action of said coating material by employing in the solution a soluble salt of iron.

3. A method of coating a metallic zinc surface which consists in subjecting said surface to the coating action of an acid zinc phosphate solution containing dissolved in the solution at least one-third as much iron as zinc.

4. A method of coating a metallic zinc surface which consists in subjecting the said surface to the coating action of an acid zinc phosphate solution and accelerating the action of said coating solution by employing in the solution a soluble salt of iron.

5. A method of coating a metallic zinc surface which comprises subjecting the said surface to the coating action of an acid manganese phosphate solution containing dissolved in the solution a soluble salt of iron.

6. A method of coating a metallic zinc surface which comprises subjecting the said surface to the coating action of an acid manganese phosphate solution containing, dissolved in the solution, a soluble salt of iron, in which solution there is at least twice as much iron as manganese.

MATTHEW GREEN.